US009855695B2

(12) United States Patent
Miyazaki et al.

(10) Patent No.: US 9,855,695 B2
(45) Date of Patent: Jan. 2, 2018

(54) DISPLAY DEVICE FOR PRODUCTION MACHINE

(71) Applicant: NISSEI PLASTIC INDUSTRIAL CO., LTD., Nagano-ken (JP)

(72) Inventors: Hiroyuki Miyazaki, Nagano-ken (JP); Chiharu Nishizawa, Nagano-ken (JP); Susumu Morozumi, Nagano-ken (JP)

(73) Assignee: NISSEI PLASTIC INDUSTRIAL CO., LTD., Hanishina-Gun, Nagano-Ken (JP)

( * ) Notice: Subject to any disclaimer, the term of this patent is extended or adjusted under 35 U.S.C. 154(b) by 280 days.

(21) Appl. No.: 13/658,520

(22) Filed: Oct. 23, 2012

(65) Prior Publication Data
US 2013/0100032 A1 Apr. 25, 2013

(30) Foreign Application Priority Data

Oct. 24, 2011 (JP) .................................. 2011-233186

(51) Int. Cl.
*G06F 3/041* (2006.01)
*B29C 45/76* (2006.01)

(52) U.S. Cl.
CPC .............. *B29C 45/76* (2013.01); *G06F 3/041* (2013.01); *B29C 2045/7606* (2013.01)

(58) Field of Classification Search
CPC ...................................... G06F 3/041
USPC ........................................ 345/173
See application file for complete search history.

(56) References Cited

U.S. PATENT DOCUMENTS

| 2006/0247822 | A1* | 11/2006 | Nishizawa | B29C 45/76 700/200 |
| 2008/0143684 | A1* | 6/2008 | Seo | G06F 3/04883 345/173 |
| 2008/0297483 | A1* | 12/2008 | Kim | G06F 3/04817 345/173 |
| 2009/0046075 | A1* | 2/2009 | Kim | G06F 3/0488 345/173 |
| 2009/0079704 | A1* | 3/2009 | Huang | G06F 3/0488 345/173 |

(Continued)

FOREIGN PATENT DOCUMENTS

| JP | 2001-145947 A | 5/2001 |
| JP | 2004-155072 A | 6/2004 |

*Primary Examiner* — Jennifer Mehmood
*Assistant Examiner* — Carl Adams
(74) *Attorney, Agent, or Firm* — Birch, Stewart, Kolasch & Birch, LLP

(57) ABSTRACT

A display device with a touch panel and a controller having a computer function to display various kinds of screens on a display surface of the display. The controller includes a multiple screen display processing function part wherein at least two independent screen display parts are displayed side by side, a screen switch processing function part to enable switching of a touched screen to the other screen by a touch/slide operation on the screen, and a switch key display processing function part by which a key display part is arranged on the display surface in an area other than the screen display parts. A plurality of switch keys are arranged and displayed in the key display part according to a key pattern corresponding to the order of the screens switched by a touch/slide operation so as to enable selection of the screens to display by a touch operation.

14 Claims, 7 Drawing Sheets

(56) References Cited

U.S. PATENT DOCUMENTS

| | | | |
|---|---|---|---|
| 2011/0167387 A1* | 7/2011 | Stallings | G06F 3/04817 |
| | | | 715/826 |
| 2011/0175830 A1* | 7/2011 | Miyazawa | G06F 1/1643 |
| | | | 345/173 |
| 2011/0197160 A1* | 8/2011 | Kim | G06F 17/241 |
| | | | 715/783 |
| 2012/0104185 A1* | 5/2012 | Carroll | F16M 11/041 |
| | | | 248/27.1 |
| 2012/0165076 A1* | 6/2012 | Yu | G06F 3/0481 |
| | | | 455/566 |
| 2012/0176322 A1* | 7/2012 | Karmi | G06F 3/04883 |
| | | | 345/173 |
| 2013/0021379 A1* | 1/2013 | Sirpal | G06F 1/1616 |
| | | | 345/659 |

\* cited by examiner

Fig. 9
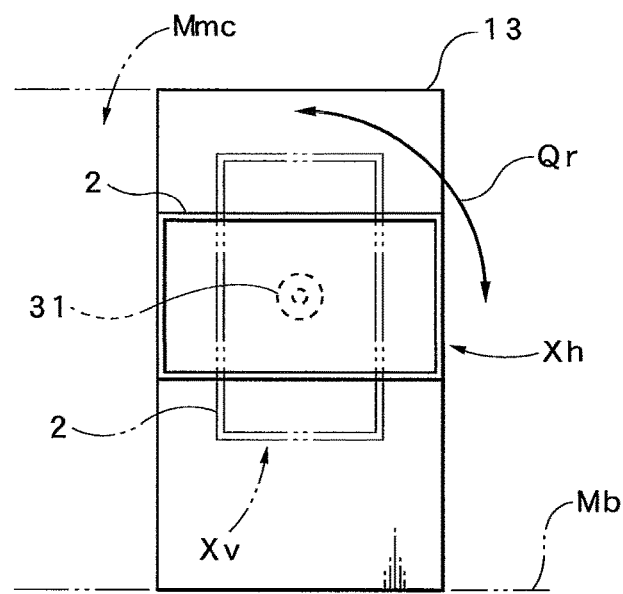
Fig. 10 (a)     Fig. 10 (b)
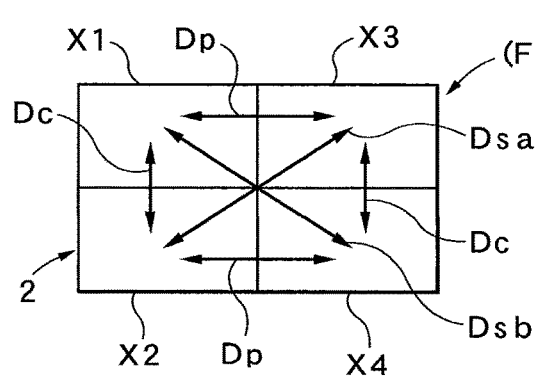 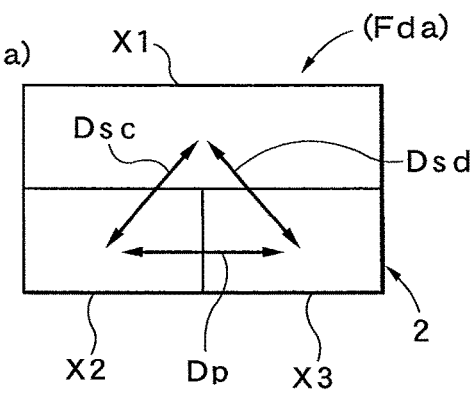

DISPLAY DEVICE FOR PRODUCTION MACHINE

TECHNICAL FIELD

The present invention relates to a display device for production machine provided with a display with a touch panel and a controller to allow display of various kinds of screens on a display surface of the display.

BACKGROUND ART

As a display device for production machine provided with a display with a touch panel and a controller having a computer function to allow display of various kinds of screens on a display surface of the display, a display device for injection molding machine disclosed in Patent Literature 1 and a display device for injection molding machine disclosed in Patent Literature 2 have been known.

The display device for injection molding machine disclosed in Patent Literature 1 is configured such that a display screen of a display unit provided in a man-machine interface of an injection molding machine is divided into two areas so as to use one area of the display screen as an exclusive main screen area and the remaining area of the display screen as an exclusive sub screen area, wherein the main screen area has a controller function switch by which a controller function of the injection molding machine can be operated and displays a setting unit which allows settings of entire conditions of the injection molding machine and monitoring data, while the sub screen area displays various kinds of data such as monitoring data desired to display as needed independently from the main screen area. The display device for injection molding machine disclosed in patent Literature 2 is also provided with a display with a touch panel and a controller having a computer function to allow display of various kinds of screens on a display surface of the display, wherein a plurality of screen switch keys provided for respective screen items to switch various kinds of screens is displayed in an upper area and a lower area of a basic screen on the display surface of the display and, as needed, a small screen such as a ten-key screen is displayed on the display surface by a window screen.

SUMMARY OF INVENTION

Technical Problem

The aforementioned conventional display devices for injection molding machine (or production machine) are, however, accompanied by the following problems that need to be solved.

Firstly, when a screen displayed on the display surface of the display is switched to another screen, it is necessary to switch screens by a switching operation of a corresponding screen switch key. In this case, production machines such as the injection molding machines are usually provided with many kinds of screens to display, which are accompanied by the tendency to have a large number of screen switch keys. As a result, there are drawbacks such as reduction of visibility and operability of screen switch keys due to reduction in the size of screen switch keys displayed on the display surface and reduction in the size of characters displayed in the upper area of the screen switch keys, further involving the increased operational error risk.

Secondly, only one screen is displayed on the display surface in principle and screens in overlapping display are small screens such as sub screens and window screens to merely serve as auxiliary screens. Accordingly, when details of molding conditions or the like are set in detail with reference to various kinds of information as expected in production machines such as injection molding machines, display may not be necessarily sufficient enough and there is room for further improvement from a viewpoint of further enhancement of setting easiness, setting preciseness, setting accuracy and setting promptness in a setting work.

Solution to Problem

A display device 1 for a production machine M according to the present invention aims at solving the aforementioned problems and in the configuration of the display device provided with a display 2 with a touch panel 2t and a controller 3 having a computer function to allow display of various kinds of screens on a display surface 2d of the display 2, the controller 3 comprises a multiple screen display processing function part Fd to enable display of at least two independent screen display parts X1 and X2 . . . side by side on the display surface 2d, a screen switch processing function part Fc to enable switching of touched screen Va . . . to other screen Vb . . . by a touching/slide operation on the screen Va . . . , and a switch key display processing function part Fk by which a key display part Xk is arranged on the display surface 2d in an area other than the screen display parts X1, X2 . . . and a plurality of screen switch keys Kx . . . , Ka . . . is arranged and displayed in the key display part Xk according to a key pattern Pk corresponding to the order of the screens Va . . . switched by a touch/slide operation so as to enable selection of the screens Va . . . to display by a touch operation.

Advantageous Effects of Invention

The display device 1 for the production machine M provided with such a structure according to the present invention exhibits remarkable effects as follows.

(1) By having the screen switch processing function part Fc to enable switching of the touched screen Va . . . to the other screen Vb . . . by a touch/slide operation on the screen Va . . . , the key display part Xk arranged on the display surface 2d in an area other than the screen display parts X1, X2 . . . , and the switch key display processing function part Fk for arranging and displaying the plurality of the screen switch keys Kx . . . , Ka . . . in the key display part Xk according to the key pattern Pk corresponding to the order of the screens Va . . . switched by a touch/slide operation so as to enable selection of the screen Va . . . to display by a touch operation, even if there are many kinds of the screens Va . . . to display in such a case as the production machine M, easiness and usability (or operability) can be improved in an operation to switch the screens Va . . . .

(2) By having the multiple screen display processing function part Fd to enable display of at least two of the independent screen display parts X1, X2 . . . side by side on the display surface 2d and the screen switch processing function part Fc to enable switching of the touched screen Va . . . to the other screen Vb . . . by a touch/slide operation on the screen Va . . . , it is possible, for example, to use one of the screens Va . . . as a setting screen and the remaining screen Vb . . . as a reference screen to obtain information, whereby even in setting details with reference to various information in such a case as the production machine M, setting easiness, preciseness, accuracy and promptness can be further enhanced in a setting work.

(3) According to a preferable embodiment, by establishing operation validating conditions in the controller 3 to make a touch/slide operation valid when an operation distance is 50 [mm] or more and/or an operation speed is 100 [mm/s] or more, the screens Va . . . can be switched or replaced only by a predetermined touch/slide operation, whereby making it possible to avoid defects such as, for example, switching the necessary screen Va . . . inadvertently by touching the display surface 2d by mistake.

(4) According to a preferable embodiment, by providing the controller 3 with the display selection processing function part Fm to enable selection of either a single screen display processing function part Fs, which enables display of one screen display part Xo on the display surface 2d, or the multiple screen display processing function part Fd, it is possible, for example, to display a screen such as a preparatory screen which does not particularly require other reference screens in the single screen display processing function part Fs so as to allow larger screen display for easier viewing and display a screen such as setting screen which requires other reference screens in the multiple screen display processing function part Fd so as to allow referring to various information, whereby usability and convenience can be enhanced through selective use of two display modes depending on the purposes.

(5) According to a preferred embodiment, by disposing the display 2 longitudinally and arranging at least two of the independent screen display parts X1, X2 . . . in a longitudinal direction, two of the screens Va . . . can be displayed compactly in an easier viewing mode.

(6) According to a preferred embodiment, by providing the screen switch processing function part Fe with the screen replacement function part Fca for replacing any of the screens Va . . . with the other screen Vb . . . when any of the displayed screen Va . . . is manipulated to a direction intersecting the other displayed screen Vb . . . by a touch/slide operation, screens to replace can be selected by an operational direction in a touch/slide operation, whereby the screens Va . . . can be replaced with each other easily and promptly.

(7) According to a preferred embodiment, by providing the screen switch processing function part Fc with the screen switch function part Fcb for switching any of the displayed screens Va . . . to screen Vc . . . which is not the other screen Vb . . . and to be displayed next according to the key pattern Pk when the screen Va is manipulated to a direction without intersecting the other displayed screen Vb . . . by a touch/slide operation, screens to switch can be selected by an operational direction in a touch/slide operation, whereby easy and prompt switching to the other screen Vc . . . can be realized.

(8) According to a preferred embodiment, by providing the switch key display processing function part Fk with a color-coded display function part Fke for displaying each of the screen switch keys Ka . . . in a color coded manner corresponding to the screen display parts X1, X2 . . . to display each of the screens Va . . . when at least two of the screens Va . . . are displayed, each of the screens Va . . . can be easily related to each of the switch keys Ka . . . , whereby contents of the displayed screens Va . . . can be promptly and certainly understood as well as enabling enhancement of working efficiency relating to manipulation and settings of the screens Va . . . .

(9) According to a preferred embodiment, by providing the multiple screen display processing function part Fd with a multiple screen display function part Fda which allows display of three or more of the independent screen display parts X1 . . . side by side on the display surface 2d at least in a longitudinal direction and a lateral direction, the amount of displayable information can be further increased in such a case as using one of the screens Va . . . as a setting screen and the remaining screen Vb . . . as a reference screen, whereby realizing a more desirable management from a viewpoint of precisely understanding a state such as entire motion status.

(10) According to a preferred embodiment, by providing the screen switch processing function part Fc with an oblique screen replacement function part Fcc to enable replacement of the screens Va . . . , in which corners of four or more of the independent screen display parts X1 . . . are adjacent to each other obliquely, by a touch/slide operation, the screens Va . . . can be replaced with each other promptly even if the number of the screens Va . . . to display increases, whereby enabling easy and prompt customization such as, for example, arranging the important screen Va . . . in a position for easier viewing.

(11) According to a preferred embodiment, by including at least the injection molding machine Mm in the production machine M, it is ideal for the injection molding machine Mm in which details such as molding conditions need to be set with reference to various information.

BRIEF DESCRIPTION OF DRAWINGS

FIG. 9 is an explanatory diagram showing an example of installing the display in the display device.

FIG. 10a is an explanatory diagram of a multiple screen display function part provided in the display device.

FIG. 10b is an explanatory diagram of an oblique screen replacement function part provided in the display device.

DESCRIPTION OF EMBODIMENTS

Next, a best embodiment according to the present invention will be explained in detail based on the drawings. Note that the accompanying drawings are provided for easy understanding of the present invention without specifying the present invention. Also, for avoidance of obscurity of the invention, detailed explanation of well-known areas will be omitted.

Figure 1:
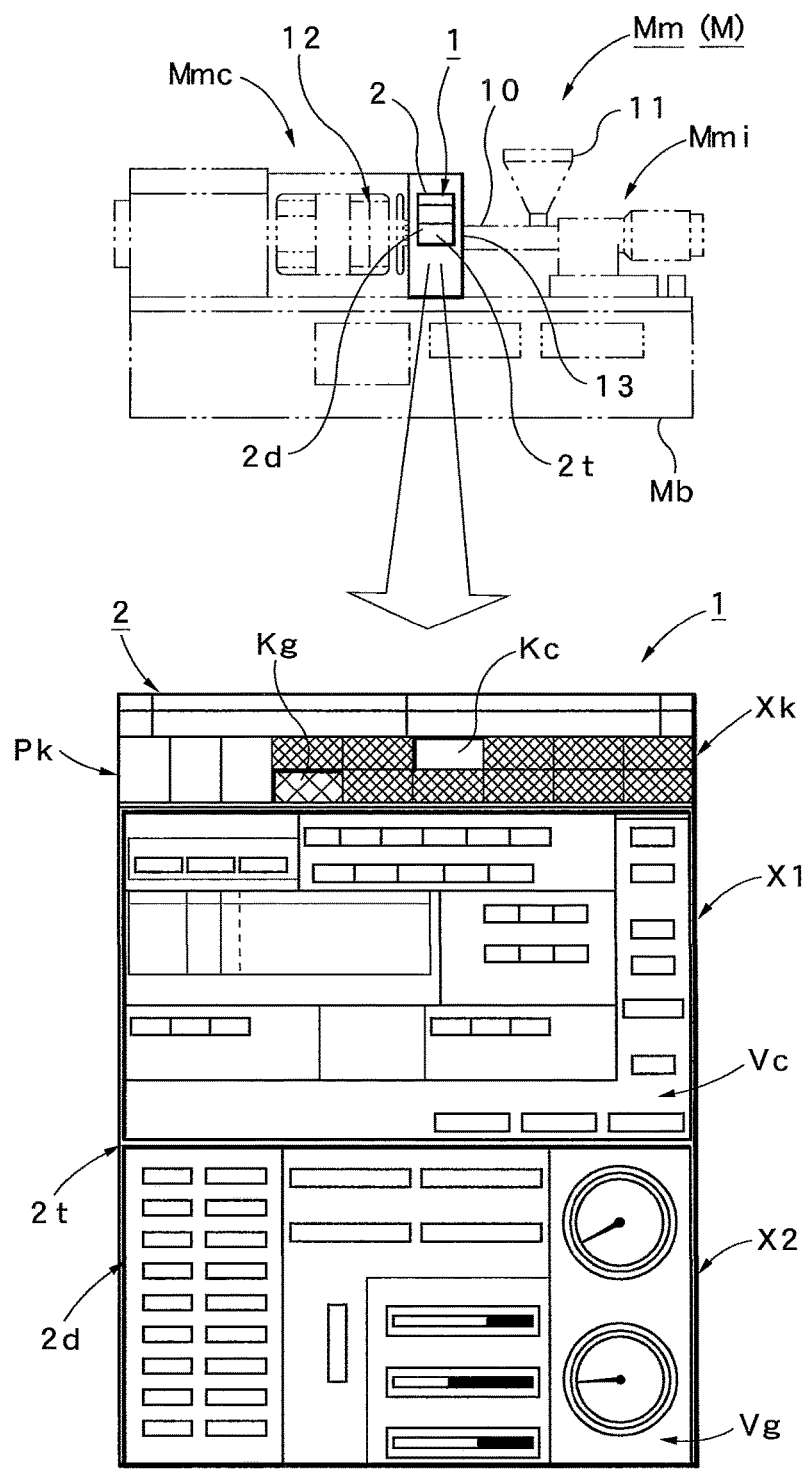
FIG. 1 is a screen view of a display in a display device according to the best embodiment of the present invention.
Figure 2:
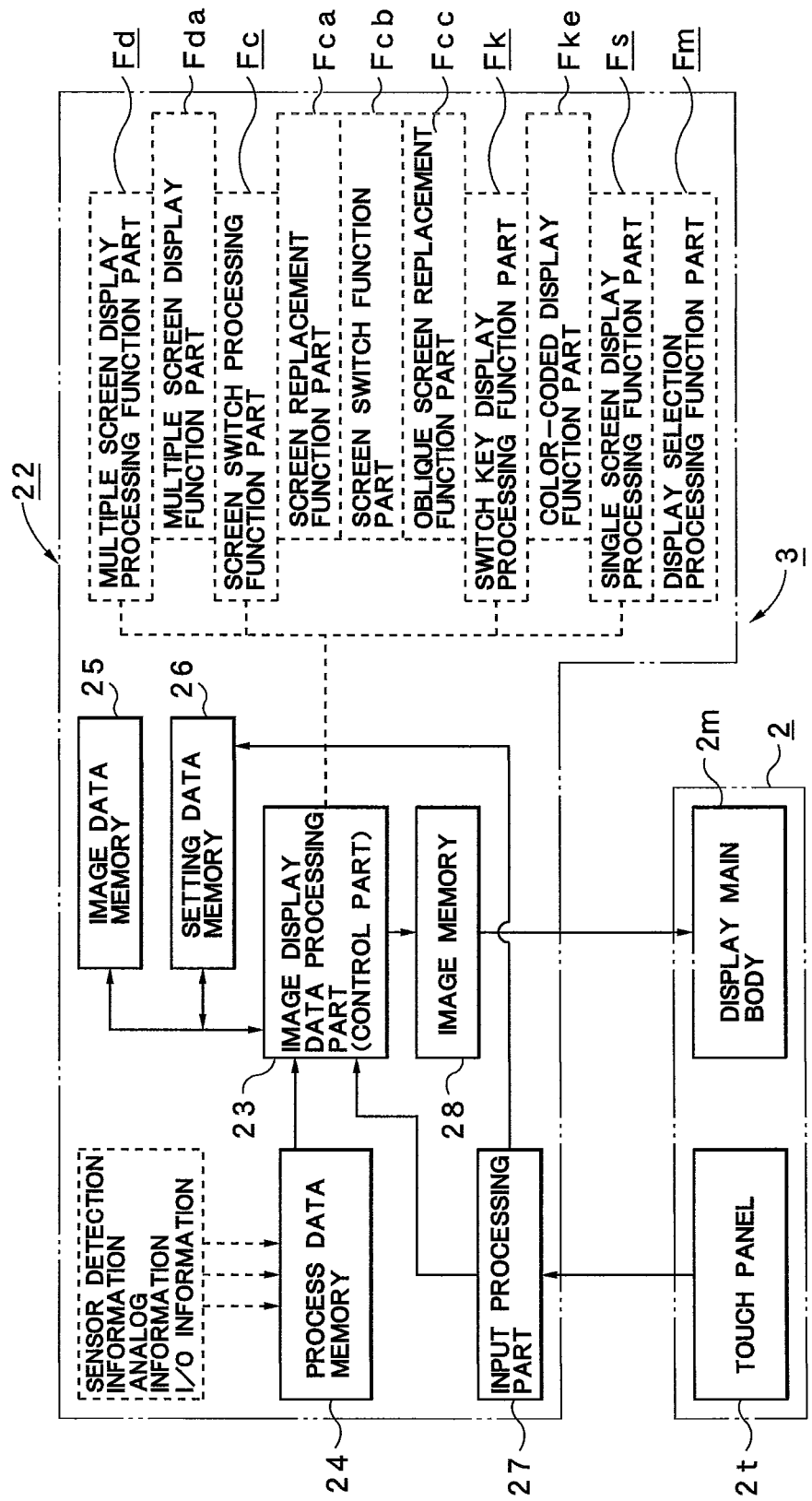
FIG. 2 is a functional block diagram of the display device.

Explained first with reference to FIG. 1 and FIG. 2 will be how a display device 1 is structured according to the embodiment and an outlined structure of an injection molding machine Mm (or production machine M) comprising the display device 1.

In FIG. 1, Mm shown by a phantom line is an injection molding machine comprising a machine base Mb as well as an injection device Mmi and a mold clamping device Mmc installed on the machine base Mb. The injection device Mmi has a heating cylinder 10, an injection nozzle which is located in a front end of the heating cylinder 10 and not shown in FIG. 1, and a hopper 11 located behind the heating cylinder 10 for supplying materials. Meanwhile, the mold clamping device Mmc has a metal mold 12 made of a movable type and a fixed type. Also arranged on the machine base Mb is a display 2 of the display device 1 by using a standing side panel 13. In this case, the display 2 is arranged longitudinally as shown in FIG. 1. Therefore, a display surface 2d of the display 2 is allowed to contain at least two independent screen display parts X1, X2 . . . arranged side by side in a longitudinal direction. By thus arranging the display 2 longitudinally, further compact display of two screens Vc . . . can be realized in an easier viewing mode. A touch panel 2t is further provided in the display 2 and the display 2 provided with the touch panel 2t is connected to a controller 3 (or display control part 22) which is as shown in FIG. 2 and incorporated in the machine base Mb.

FIG. 2 is a functional block diagram of the display device 1. The display device 1 is composed of the display 2 and the display control part 22. The display control part 22 is also composed of the controller 3 having a computer function including hardware such as CPU and internal memory and various kinds of software and, in particular, made to function by HMI (Human Machine Interface) program. The HMI program is software for setting and displaying operation conditions of the injection molding machine Mm and displaying operation monitoring data of the injection molding machine Mm. The display control part 22 includes an image display data processing part (or control part) 23, a process data memory 24 in which detection data of various kinds of sensors, input/output information and analog information or other data are written, an image data memory 25 for storing various kinds of image data, a setting data memory 26 for storing various kinds of setting data such as operation conditions, an input processing part 27 connected to the touch panel 2t, and an image memory 28 connected to the display 2. The display 2 is composed of a combination of a display main body 2m using a color liquid crystal display or other displays to enable color display and the touch panel 2t.

Next, a concrete function of the display device 1 according to the present embodiment will be explained with reference to FIG. 1 to FIG. 6.

The display device 1 is provided with various kinds of function parts to be executed according to a processing program stored in a program area of the internal memory, or more precisely comprises at least a multiple screen display processing function part Fd, a screen switch processing function part Fc, a switch key display processing function part Fk, a single screen display processing function part Fs and a display selection processing function part Fm as shown in FIG. 2. In addition, the multiple screen display processing function part Fd includes a multiple screen display function part Fda and the screen switch processing function part Fc includes a screen replacement function part Fca, a screen switch function part Fcb, and an oblique screen replacement function part Fcc. Further, the switch key display processing function part Fk includes a color-coded display function part Fke.

In this case, the multiple screen display processing function part Fd realizes a function to enable display of two of the independent screen display parts X1 and X2 side by side on the display surface 2d of the display 2, wherein the first screen display part X1 is displayed on the upper side of the longitudinal display surface 2d and the second screen display part X2 is displayed on the lower side thereof as shown in FIG. 1. Note that a key display part Xk to be described later is secured above the first screen display part X1. FIG. 1 shows a mode in which an injection/measurement screen Vc is displayed in the first screen display part X1 and a process monitoring screen Vg is displayed in the second screen display part X2.

Figure 3:
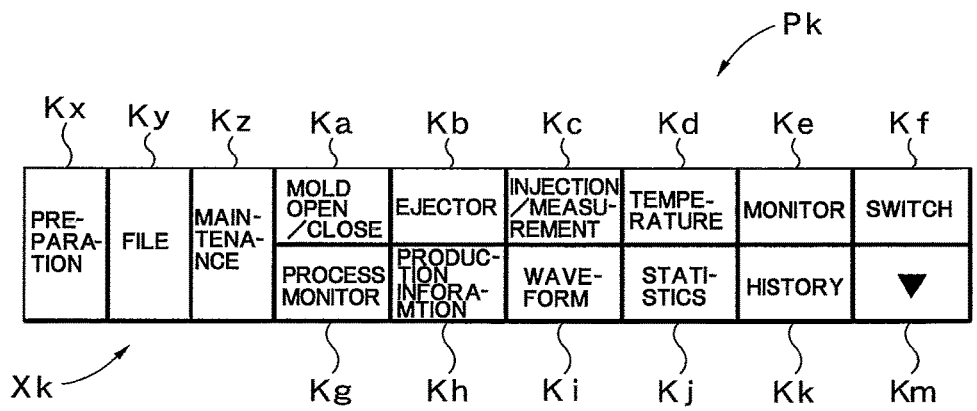
FIG. 3 is a display pattern view of screen switch keys displayed according to a key pattern in the display of the display device.
Figure 4:
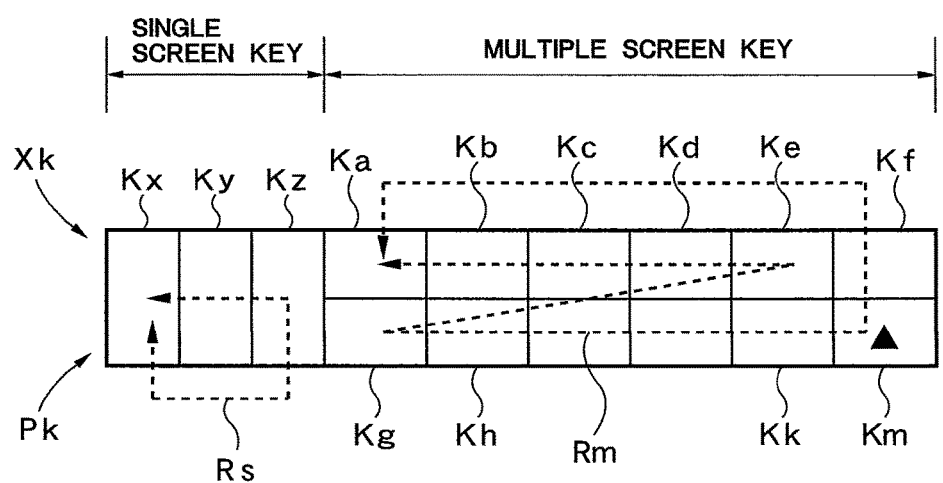
FIG. 4 is a functional explanatory diagram of the key pattern.

The switch key display processing function part Fk realizes a function to arrange the key display part Xk on the display surface 2d in an area other than the two screen display parts X1, X2 . . . in the display 2 as shown in FIG. 1, and arrange and display a plurality of screen switch keys Kx . . . , Ka . . . in the key display part Xk according to a key pattern Pk corresponding to the order of the screens Va . . . (Va is not shown) switched by a touch/slide operation so as to enable selection of the screens Va . . . to display by a touch operation as shown in FIG. 3 and FIG. 4. The exemplified key pattern Pk has three screen switch keys Kx, Ky and Kz, each of which serves as a single screen key to enable display of only one of the screens Vx . . . on the display surface 2d by the single screen display processing function part Fs, and has a number of screen switch keys Ka, Kb, Kc . . . Kk . . . , each of which serves as a multiple screen key to enable display in one of the first screen display part X1 and the second screen display part X2 by the multiple screen display processing function part Fd. In this case, the three screen switch keys Kx . . . serving as single screen keys are displayed in one line and a number of the screen switch keys Ka . . . serving as multiple screen keys is displayed in two lines. The single screen keys and the multiple screen keys can be therefore easily distinguished. Note that Km is a hierarchy replacement key. A first hierarchy of relatively high use is shown in FIG. 3 and screen switch keys of a second hierarchy are displayed in a form of replacing the first hierarchy by touching the hierarchy replacement key Km.

The screen switch processing function part Fc realizes a function to enable, by a touch/slide operation on the first screen display part X1 or the second screen display part X2, switching of the screen Va . . . displayed in the touched screen display part which is either the first screen display part X1 or the second screen display part X2 to the other screen Vb . . . . In particular, the screen switch processing function part Fc has the screen replacement function part Fca and the screen switch function part Fcb.

Figure 5:
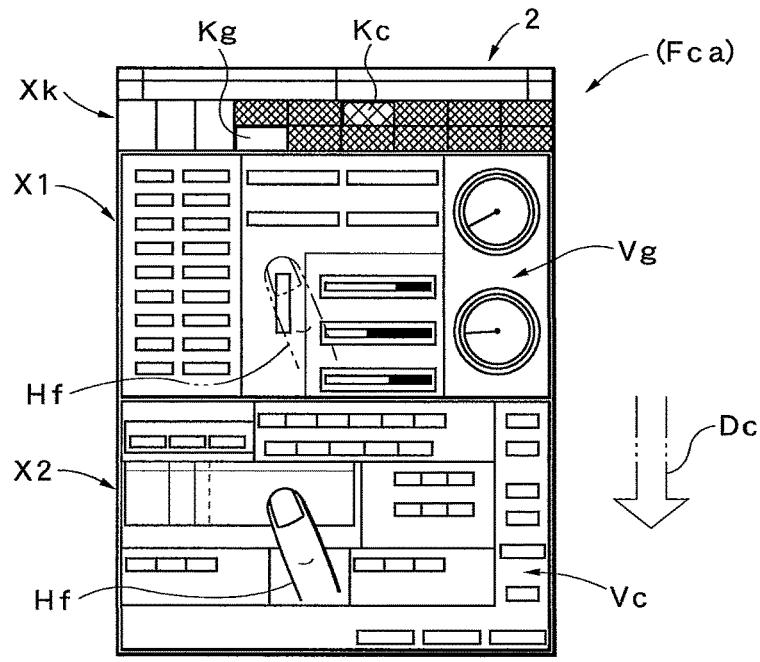
FIG. 5 is a functional explanatory diagram of a screen replacement function part provided in the display device.
Figure 6:
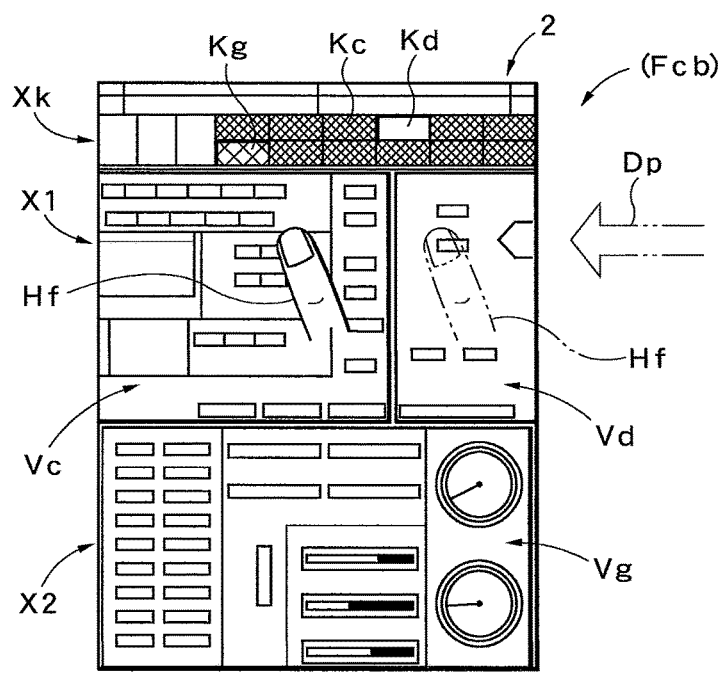
FIG. 6 is a functional explanatory diagram of a screen switch function part provided in the display device.

The screen replacement function part Fca realizes a function to replace any of the screens Va . . . with the other screen Vb . . . when any of the displayed screens Va . . . is manipulated to a direction intersecting the other displayed screen Vb . . . by a touch/slide operation. That is, taking the mode shown in FIG. 1 as an example in which the injection/measurement screen Vc is displayed in the first screen display part X1 and the process monitoring screen Vg is displayed in the second screen display part X2, by touching the first screen display part X1 using a finger Hf as shown by a phantom line in FIG. 5 and sliding it downward or to a direction intersecting the second screen display part X2 (i.e. direction of arrow Dc), the injection/measurement screen Vc moves downward and the process monitoring screen Vg moves upward. Then, the injection/measurement screen Vc is displayed in the second screen display part X2 and the process monitoring screen Vg is displayed in the first screen display part X1 at timing which is after manipulation only by a fixed distance. Therefore, the injection/measurement screen Vc and the process monitoring screen Vg are replaced with each other by inversion of upper and lower positions. FIG. 5 shows a replaced mode. Note that even though the case of applying a downward slide operation was exemplified, touching the second screen display part X2 using the finger Hf and sliding it upward operation can be applied similarly. By having the screen replacement function part Fca as stated above, screens to replace can be selected by an operational direction in a touch/slide operation, whereby enabling easy and prompt replacement of the screens Va . . . with each other.

In this case, operation validating conditions in an operation by a touch/slide operation are set in advance in the controller 3. In the exemplified case, operation validating conditions are set such that a touch/slide operation is made valid only when any one of conditions that are an operation distance of 50 [mm] or more and an operation speed of 100 [mm/s] and more is satisfied. Accordingly, when an operation distance is less than 50 [mm] and an operation speed is less than 100 [mm/s] in a touch/slide operation, the touch/slide operation becomes invalid. Note that, as needed, operation validating conditions may also be set such that a touch/slide operation is made valid subject to a condition of satisfying both an operation distance of 50 [mm] or more and an operation speed of 100 [mm/s] or more. By setting such operation validating conditions, the screens Va . . . can be switched or replaced only by a predetermined touch/slide operation with an advantage of, for example, avoiding a malfunction of inadvertently switching the necessary screens Va . . . by touching the display surface 2d by mistake.

The screen switch function part Fcb realizes a function such that when any of the displayed screens Va . . . is manipulated to a direction which does not intersect the other displayed screen Vb . . . by a touch/slide operation, the screen Vc . . . which is not the other screen Vb . . . and to be displayed next according to the key pattern Pk is displayed. That is, similar to the above case, taking the mode shown in FIG. 1 as an example in which the injection/measurement screen Vc is displayed in the first screen display part X1 and the process monitoring screen Vg is displayed in the second screen display part X2, by touching the first screen display part X1 using the finger Hf as shown by a phantom line in FIG. 6 and sliding it leftward or to a direction without intersecting the second screen display part X2 (i.e. direction of arrow Dp), the injection/measurement screen Vc is scrolled leftward and hidden from the first screen display part X1, after which a temperature screen Vd which is a screen to be displayed next is scrolled from the direction of the arrow Dp and appears in the first screen display part X1. Therefore, in the first screen display part X1, screen display is switched from the injection/measurement screen Vc to the temperature screen Vd. Also in this case, the aforementioned operation validating conditions are applied similarly. Note that even though the case of applying a leftward slide operation was exemplified, a rightward slide operation can be similarly applied and in this case, screen display is switched to an ejector screen Vb (not shown). By having the screen switch function part Fcb as stated above, screens to switch can be selected by an operational direction in a touch/slide operation, whereby easy and prompt switch to the other screen Vc . . . can be realized.

Meanwhile, the screen switch processing function part Fc and the switch key display processing function part Fk are closely related to each other. The screen switch keys Kx . . . , Ka . . . displayed in the key display part Xk are arranged according to the key pattern Pk corresponding to the order of the screens Va . . . switched by a touch/slide operation. In the aforementioned example, display is switched to the temperature screen Vd by scrolling the injection/measurement screen Vc leftward and display is switched to the ejector screen Vb by scrolling the injection/measurement screen Vc rightward, wherein the switching order is determined according to the arrangement of the key pattern Pk. That is, an ejector screen switch key Kb, an injection/measurement screen switch key Kc and a temperature screen switch key Kd are arranged in this order in advance according to the key pattern Pk. Other screen switch keys Ka . . . are similarly arranged and the order of each of the screens Va . . . to be switched by a touch/slide operation matches the order of each of the screen switch keys Ka . . . as shown by a broken line Rm in FIG. 4.

The switch key display processing function part Fk has the color-coded display function part Fke to allow color-coded display of each of the screen switch keys Ka . . . corresponding to the screen display parts X1, X2 . . . to display each of the screens Va . . . when two of the screens Va . . . are displayed. As a color coding example, as shown in an image of FIG. 1, "dark grey" is used for screen switch keys that are not selected, "white" is used for a screen switch key corresponding to a screen displayed in the first screen display part X1, and "light grey" is used for a screen switch key corresponding to a screen displayed in the second screen display part X2. In the case of FIG. 1, the injection/measurement screen Vc is displayed in the first screen display part X1 and therefore "white" is used for the corresponding injection/measurement screen switch key Kc, whereas the process monitoring screen Vg is displayed in the second screen display part X2 and therefore "light grey" is used for the corresponding process monitoring screen switch key Kg. By having the color-coded display function Fke as stated above, each of the screens Va . . . can be easily related to each of the switch keys Ka . . . , whereby contents of the displayed screen Va . . . can be promptly and certainly understood with an advantage of further enhancing working efficiency relating to manipulation and setting of the screens Va . . . .

On the other hand, the single screen display processing function part Fs realizes a function to allow display by a general display method or more precisely a function to display one screen display part Xo on the display surface 2d of the display 2. Accordingly, for example, a screen such as a preparatory screen Vx which does not particularly require other reference screens is displayed by the single screen display processing function part Fs so as to exclusively show one screen Vx . . . on the display surface 2d, whereby realizing larger screen display for easier viewing. The screen Vx . . . displayed in the screen display part Xo is selected in advance by the single screen display processing function part Fs as shown in FIG. 3 and FIG. 4, and in the exemplified case, the three screen switch keys Kx, Ky and Kz are displayed side by side in one line in a lateral direction. Therefore, as shown in FIG. 3, the three keys can be distinctively distinguished from the screen switch keys Ka, Kb, Kc . . . Kk . . . used by the multiple screen display processing function part Fd and displayed in two lines. Even in the screen Vx . . . displayed by the single screen display processing function part Fs, the aforementioned touch/slide operation enables screen switching and the order of the screens Vx . . . to be switched by a touch/slide operation matches the order of each of the screen switch keys Kx . . . shown by the broken line Rs in FIG. 4.

By thus selecting one of the three screen switch keys Kx, Ky and Kz, it can be displayed as one independent screen Vx . . . in one screen display part Xo. In contrast, by selecting each of the screen switch keys Ka, Kb, Kc . . . Kk . . . used by the multiple screen display processing function part Fd and displayed in two lines, screens are displayed in two lines on the display surface 2d by the first screen display part X1 and the second screen display part X2 as stated above. That is, selection of each of the screen switch keys Kx . . . , Ka . . . automatically set a display mode. Accordingly, it is possible to select any of the single screen display processing function part Fs and the multiple screen display processing function part Fd and the selected function serves as the display selection processing function part Fm. By having the display selection processing function part Fm as stated above, for example, a screen such as the preparatory screen Vx which does not particularly require other reference screens is displayed by the single screen display processing function part Fs and a screen such as the injection/measurement screen Vc to function as a setting screen which requires other reference screens is displayed by the multiple screen display processing function part Fd in a preferable manner, whereby usability and convenience can be enhanced through selective use of two display modes depending on the purposes.

Figure 7:
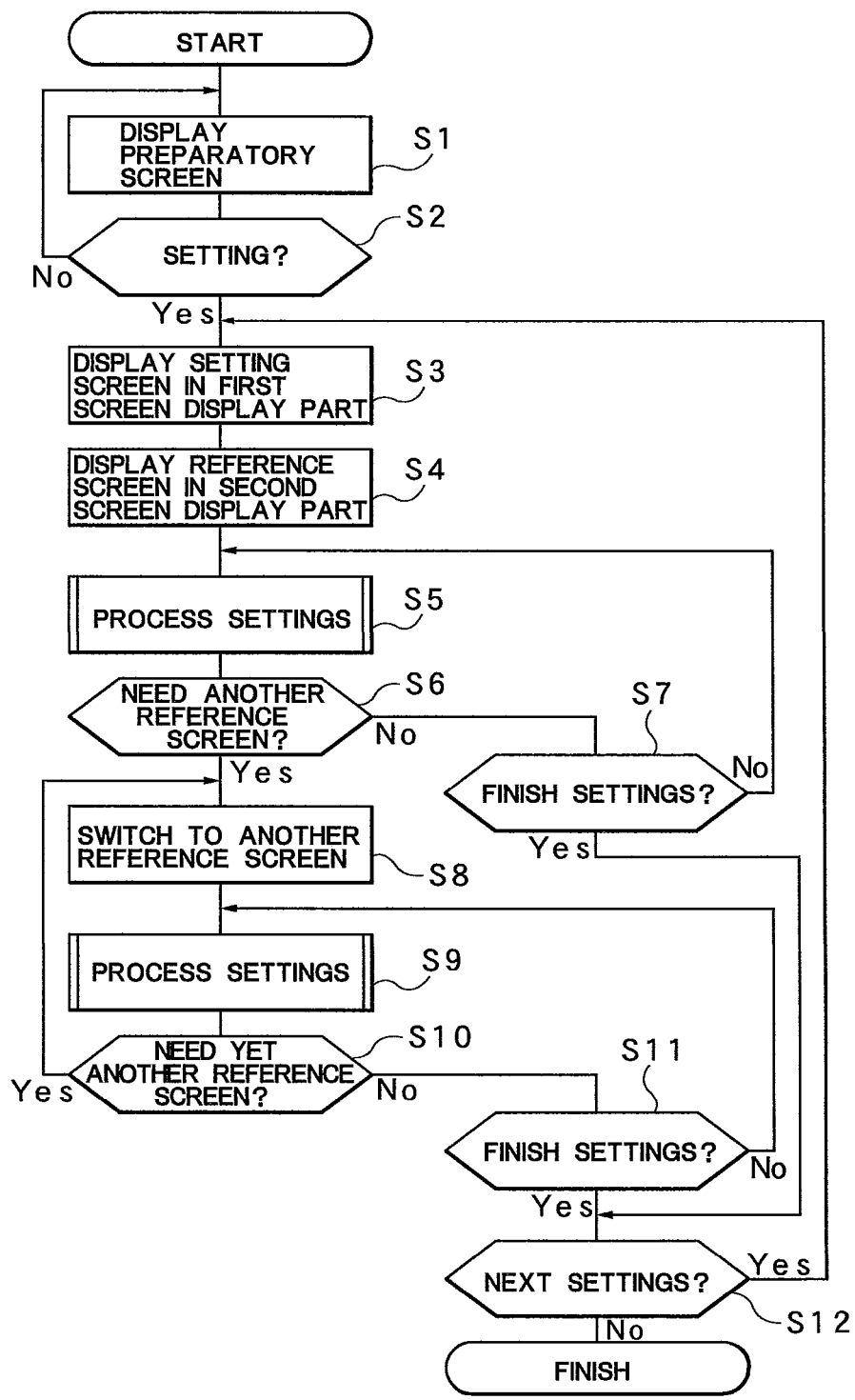
FIG. 7 is a flowchart to explain one example of how to use the display device.
Figure 8:
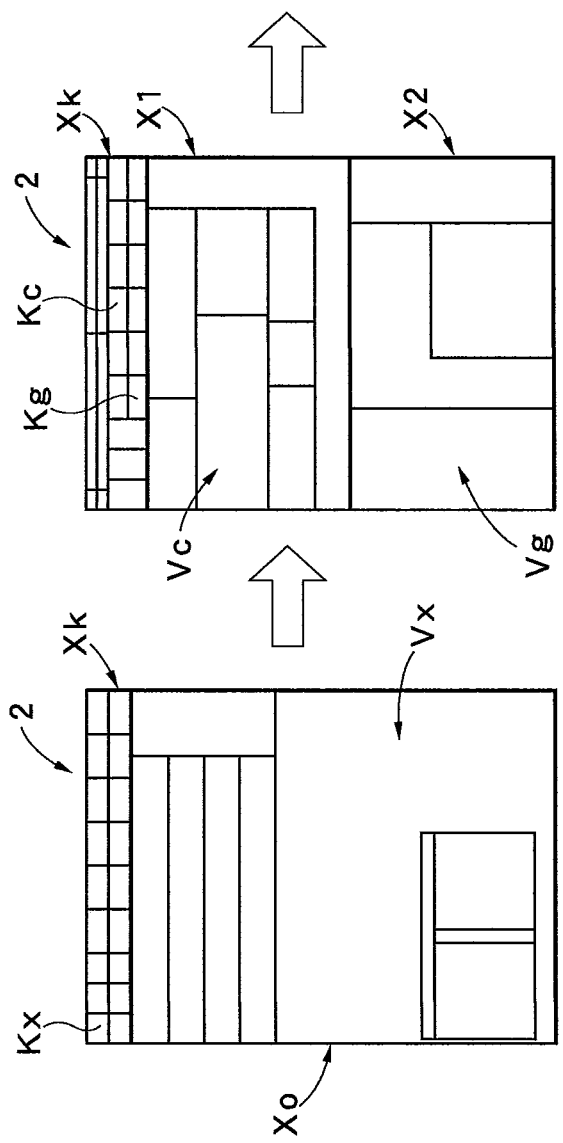
FIG. 8a is a screen view displayed in the display based on the use method.
FIG. 8b is another screen view displayed in the display based on the use method.
FIG. 8c is yet another screen view displayed in the display based on the use method.

Next, how to use the display device 1 according to this embodiment will be explained with reference to a flowchart shown in FIG. 7 and screen views of the display 2 as shown in FIGS. 8a to 8c.

An example of use in a work to set molding conditions or the like is shown. Explanation will be made on the assumption that the preparatory screen Vx is displayed currently by the single screen display processing function part Fs as shown in FIG. 8a (step S1). In this case, by touching the preparatory screen switch key Kx serving as a single screen key, only the preparatory screen Vx is displayed by the screen display part Xo to cover the display surface 2d almost entirely. Therefore, an operator is allowed to carry out a preparatory work by using the displayed preparatory screen Vx.

Next, molding conditions on the injection device Mmi such as an injection speed are assumed to be set by an operator (step S2). In this case, first of all, the injection/measurement screen switch key Kc serving as a multiple screen key is touched. Therefore, the multi screen display processing part Fd causes display by the first screen display part X1 and the second screen display part X2, whereby the injection/measurement screen Vc is displayed in the first screen display part X1 (step S3). Note that, at this point, a screen which had been displayed in the second screen display part X2 before the preparatory screen Vx was displayed remains to be displayed in the second screen display part X2.

Next, a reference screen which can be referred to in setting molding conditions such as an injection speed is displayed. For example, when the process monitoring screen Vg is required, the process monitoring screen switch key Kg is touched to display the process monitoring screen Vg in the second screen display part X2 (step S4). This display mode is as shown in FIG. 8b. Therefore, an operator is allowed to carry out a process to set necessary molding conditions or the like by using the injection/measurement screen Vc while referring to the process monitoring screen Vg (steps S5, S6 and S7).

Meanwhile, it is assumed that another reference screen such as, for example, a history screen Vk is further required during a setting process (step S6). In this case, an operator performs the aforementioned touch/slide operation four times by touching the second screen display part X2 using the finger Hf to display the history screen Vk in the second screen display part X2 according to the aforementioned key pattern Pk (step S8). The switch mode at this time is as shown in FIG. 8c. Therefore, an operator is allowed to carry out a process to set necessary molding conditions or the like by using the injection/measurement screen Vc while referring to the history screen Vk (step S9). Moreover, when yet another reference screen is required during a setting process, a similar a touch/slide operation is performed on the second screen display part X2 to allow switching to display a necessary screen (S10, S8, S9 . . . ). Then, when another setting process such as a setting process on the mold clamping device Mmc still remains after finishing a setting process in the injection/measurement screen Vc, a similar work relating to a setting process can be performed (steps S11, S12, S3 . . . ).

Thus, the display device 1 according to this embodiment comprises the screen switch processing function part Fc to enable switching the touched screen Va . . . to the other screen Vb . . . by a touch/slide operation on the screen Va . . . , and the switch key display processing function part Fk by which the key display part Xk is arranged on the display surface 2d in an area other than the screen display parts X1, X2 . . . and the plurality of the screen switch keys Kx . . . , Ka . . . is arranged and displayed in the key display part Xk according to the key pattern Pk corresponding to the order of the screens Va . . . switched by a touch/slide operation so as to enable selection of the screens Va . . . to display by a touch operation, whereby making it possible to enhance easiness and usability (or operability) in an operation to switch the screens Va . . . even if there are many kinds of the screens Va to display in such a case as the production machine M.

In addition, by having the multiple screen display processing function part Fd to enable display of at least two of the independent screen display parts X1, X2, . . . side by side on the display surface 2d and the screen switch processing function part Fc to enable switching of the touched screen Va . . . to the other screen Vb . . . by a touch/slide operation on the screen Va . . . , it is possible, for example, to use one of the screens Va . . . as a setting screen and the remaining screen Vb . . . as a reference screen to obtain information, whereby setting easiness, preciseness, accuracy and promptness can be further enhanced in a setting work even in detailed setting with reference to various information in such a case as the production machine M. In particular, by including the exemplified injection molding machine Mm in the production machine M, it is ideal for the injection molding machine Mm in which details such as molding conditions need to be set with reference to various information.

Next, a modified example of the display device 1 according to the embodiment will be explained with reference to FIG. 9 and FIGS. 10a and 10b.

FIG. 9 shows a modified example of a mounting mode of the display 2. The mounting mode in FIG. 1 shows an arrangement of the longitudinal display 2 in the side panel 13, whereas FIG. 9 shows the longitudinal display 2 whose rear surface center position is mounted on a predetermined position of the side panel 13 by a rotation support part 31. Therefore, in addition to allowing settings of the longitudinal display 2 in a longitudinal position Xv as shown by a phantom line, setting thereof in a landscape position Xh as shown by a solid line can also be realized by rotational displacement at 90 [°] to a direction of an arrow Qr.

Accordingly, by using such a modified example, the display 2 can be used not only as a common landscape display but also as the longitudinal display 2 as shown in FIG. 1.

FIGS. 10*a* and 10*b* show three or more of the independent screen display parts X1 . . . displayed side by side on the display surface 2*d* of the display 2 at least in a longitudinal direction and a lateral direction by providing the multiple screen display function part Fda for the multiple screen display processing function part Fd. By having the multiple screen display function part Fda as stated above, in a case of using one of the screens Va . . . as a setting screen and the remaining screens Vb . . . as reference screens, the amount of displayable information can be increased to realize desirable management from a viewpoint of precisely understanding a state such as entire operation status.

In particular, FIG. 10*a* shows four of the screen display parts X1 . . . or more precisely the first screen display part X1, the second screen display part X2, a third screen display part X3 and a fourth screen display part X4 displayed on the display surface 2*d* of the display 2 in a landscape arrangement. In this case, by providing the oblique screen replacement function part Fcc for the screen switch processing function part Fc, it is possible to realize a function to enable replacement of the screens Va . . . , in which corners of four or more of the independent screen display parts X1 are adjacent to each other obliquely, by a touch slide operation. In FIG. 10*a*, a direction of an arrow Dsa and a direction of an arrow Dsb refer to an operational direction in a replacing operation. The oblique screen replacement function part Fcc is applicable to four or more or in particular an even number of the screen display parts X1 . . . . Accordingly, by having the oblique screen replacement function part Fcc as stated above, even if the number of the screens Va . . . to display increases, the screens Va . . . can be replaced promptly to enable easy and prompt customization such as, for example, arranging the important screen Va . . . in a position easier to see.

FIG. 10*b* also shows three of the screen display parts X1 . . . or more precisely, the first screen display part X1, the second screen display part X2 and the third screen display part X3 displayed on the display surface 2*d* of the display 2 in a landscape arrangement. In this case, the first screen display part X1 is shown in landscape display with a length equivalent to adding the second screen display part X2 and the third screen display part X3. In FIG. 10*b*, a direction of an arrow Dsc and a direction of an arrow Dsd refer to an operational direction in a replacing operation. Note that like reference numbers in FIG. 9 and FIG. 10 refer to like elements in FIG. 1 to FIG. 8 for clarity of the structure.

Although details of the best embodiment are as explained above, the present invention is not limited to such an embodiment and any changes, additions and deletions can be made in a detailed structure, shape, number and method or the like in a range without deviating from the gist of the present invention. For example, in spite of setting operation validating conditions in a touch/slide operation in the controller 3, such setting is not necessarily required. Also, a range falling in about ±45 [°] relative to the center (line) can be included in a direction to intersect a screen in a touch/slide operation. Note that a direction without intersecting a screen is also considered in a similar concept. Meanwhile, the display 2 can be of any type and various types of display unit can be used. The display 2 may be arranged integrally with or separately from the injection molding machine Mm (or the production machine M).

INDUSTRIAL APPLICABILITY

The display device according to the present invention can be used for various kinds of production machines including not only the exemplified injection molding machine but also machine tools and production robots.

REFERENCE SIGNS LIST

1: Display device, 2: Display, 2*t*: Touch panel, 2*d*: Display surface, 3: Controller, M: Production machine, Mm: Injection molding machine, Va . . . : Screen, X1: Screen display part, X2: Screen display part, Xo: Screen display part, Xk: Key display part, Kx: Screen switch key, Pk: Key pattern, Ka . . . : Screen switch key, Fd: Multiple screen display processing function part, Fda: Multiple screen display function part, Fc: Screen switch processing function part, Fca: Screen replacement function part, Fcb: Screen switch function part, Fcc: Oblique screen replacement function part, Fk: Switch key display processing function part, Fke: Color-coded display function part, Fs: Single screen display processing function part, Fm: Display selection processing function part

CITATION LIST

Patent Literature 1

Unexamined Japanese Patent Application Publication No. 2001-145947

Patent Literature 2

Unexamined Japanese Patent Application Publication No. 2004-155072

The invention claimed is:

1. A display device (1) for an injection molding machine M, comprising
   a display (2) with a touch panel (2*r*), and
   a controller (3) having a computer function to enable displaying of various kinds of screens on a display surface (2*d*) of the display (2),
   wherein the controller (3) includes:
   a multiple screen display processing function part (Fd) adapted to enable displaying of at least two independent screen display parts (X1, X2) adjacent to each other on the display surface (2*d*);
   a screen switch processing function part (Fe) adapted to enable switching of a touched one of the screens (Va . . . ) to another one of the screens (Vb . . . ) by a touch/slide operation on the touched one of the screens (Va, Vb . . . ), and
   a switch key display processing function part (Fc) adapted to arrange a key display part (Xk) in a position on the display surface (2*d*) in an area of the display (2) other than an area of the screen display parts (X1, X2), and
   the key display part (Xk) includes a plurality of enlarged single screen switch keys (Kx, Ky, and Kz) and a plurality of multiple screen switch keys (Ka, Kb, Kc, Kd, Ke, Kf, Kg, Kh, Ki, Kj, Kk, and Km) arranged in positions according to a key pattern (Pk), said plurality of multiple screen switch keys (Ka, Kb, Kc, Kd, Ke, Kf, Kg, Kh, Ki, Kj, Kk and Km) being reduced in size relative to the enlarged single screen switch keys (Kx, Ky and Kz),
   wherein relative positions of the screens (Va,Vb . . . ) are switchable on the display surface (2*d*) by a touch/slide operation (Rs) of one of the plurality of enlarged single screen switch keys (Kx, Ky, and Kz) to display a single screen (Vx), and alternatively enable two or more of the screens (Va, Vb . . . ) to be displayed on the display surface (2d) by a touch operation (Rm) of one of the plurality of multiple screen switch keys (Ka, Kb, Kc, Kd, Ke, Kf, Kg, Kh, Ki, Kj, Kk and Km), said plurality of enlarged single screen switch keys (Kx, Ky and Kz) are of a predetermined height and width and displayed on one line wherein each of the enlarged single screen switch keys (Kx, Ky and Kz) enables the display of the single screen (Vx . . . ) on the display surface (2d) by a single screen display processing function part (Fs), and said plurality of multiple screen switch keys (Ka, Kb, Kc, Kd, Ke, Kf, Kg, Kh, Ki, Kj, Kk, and Km) are reduced in size and displayed on two lines, each of which serves as a multiple screen key to enable the display of two or more screens (Va, Vb) by the multiple screen display processing function part (Fd), said plurality of enlarged single screen switch keys (Kx, Ky and Kz) having a predetermined height and being arranged at an upper portion of the display (2) with the plurality of multiple screen switch keys (Ka, Kb, Kc, Kd, Ke, Kf, Kg, Kh, Ki, Kj, Kk and Km) being arranged to one side of the enlarged single screen switch keys (Kx, Ky and Kz) at the upper portion of the display (2) wherein each of the plurality of multiple screen switch keys (Ka, Kb, Kc, Kd, Ke, Kf, Kg, Kh, Ki, Kj, Kk and Km) has a height wherein two of the multiple screen switch keys (Ka, Kb, Kc, Kd, Ke, Kf, Kg, Kh, Ki, Kj, Kk and Km) positioned one on top of the other is substantially equal to the predetermined height of the enlarged single screen switch keys (Kx, Ky and Kz) arranged adjacent thereto.

2. The display device for the injection molding machine according to claim 1, wherein operation validating conditions are set in the controller (3) in order to make a touch/slide operation valid under an operation distance of 50 millimeters or more.

3. The display device for the injection molding machine according to claim 1, wherein operation validating conditions are set in the controller (3) in order to make the touch/slide operation valid under an operation speed of 100 millimeters/second or more.

4. The display device for the injection molding machine according to claim 1, wherein operation validating conditions are set in the controller (3) in order to make a touch/slide operation valid under an operation distance of 50 millimeters or more and an operation speed of 100 millimeters/second.

5. The display device for the injection molding machine according to claim 1, wherein the controller (3) has a single screen display processing function part (Fs) adapted to enable displaying of one independent screen on the display surface.

6. The display device for the injection molding machine according to claim 5, wherein the controller has a display selection processing function part (Fm) adapted to enable selecting of either the single screen display processing function part (Fs) or the multiple screen display processing function part (Fd) for the display surface (2d).

7. The display device for the injection molding machine according to claim 1, wherein the display is formed longitudinally and mounted longitudinally and includes the at least two of the independent screen display parts (X1, X2) arranged in a longitudinal direction.

8. The display device for the injection molding machine according to claim 7, wherein the display (2) is structured to have a rear surface center position mounted on a predetermined position of a side panel (13) by a rotation support part (31) and allowed to be set in at least a longitudinal position or a landscape position.

9. The display device for the injection molding machine according to claim 1, wherein the screen switch processing function part (Fc) has a screen replacement function part (Fcc) adapted to replace any of the screens (Va, Vb . . . ) with another of the screens (Va, Vb . . . ) upon manipulating any of the displayed screens (Va, Vb . . . ) to a direction intersecting another of the displayed screens (Va, Vb . . . ) by the touch/slide operation.

10. The display device for the injection molding machine according to claim 1, wherein the multiple screen display processing function part (Fd) has a screen switch function part (Fcb) adapted to switch any one of the displayed screens (Va, Vb . . . ) with other than another of the displayed screens (Va, Vb . . . ) and to be displayed next according to the key pattern Pk upon manipulating the any one of the displayed screens (Va, Vb . . . ) to a direction without intersecting the another of the displayed screens (Va, Vb . . . ) by the touch/slide operation.

11. The display device for the injection molding machine according to claim 1, wherein the key pattern (Pk) includes:
the number of screen switch keys (Kx, Ky and Kz) is three, and the number of screen switch keys (Ka, Kb, Kc, Kd, Ke, Kf, Kg, Kh, Ki, Kj, Kk, and Km) is twelve; and
wherein a switch key display processing function part (Fk) has a color-coded display function part (Fke) adapted to display each of the screen switch keys (Kx, Ky, Kz, Ka, Kb, Kc, Kd, Ke, Kf, Kg, Kh, Ki, Kj, Kk, and Km) in a color coded manner corresponding to the screen display parts (X1, X2) to display the respective screens in at least two of the screens.

12. The display device for the injection molding machine according to claim 1, wherein the multiple screen display processing function part (Fd) has a multiple screen display function part (Fda) for displaying three or more of the independent screen display parts (X1, X2, X3, X4) adjacent to each other on the display surface (2d) at least in a longitudinal direction and a lateral direction.

13. The display device for the injection molding machine according to claim 12, wherein the screen switch processing function part (Fc) has an oblique screen replacement function part (Fcc) adapted to enable replacing of the screens with corners of four or more of the independent screen display parts (X1, X2, X3, X4) being adjacent to each other obliquely by a touch/slide operation.

14. The display device for the injection molding machine according to claim 1, wherein the switch key display processing function part (Fc) is adapted to arrange the key display part (Xk) in a fixed position on the display surface (2d) in an area of the display (2), and
the key display part (Xk) includes the plurality of screen switch keys (Kx, Ky, Kz, Ka, Kb, Kc, Kd, Ke, Kf, Kg, Kh, Ki, Kj, Kk, and Km) arranged in fixed positions according to the key pattern (Pk).

* * * * *